(12) United States Patent
Yu et al.

(10) Patent No.: US 9,319,390 B2
(45) Date of Patent: Apr. 19, 2016

(54) METHOD AND APPARATUS FOR PROVIDING A TRUST LEVEL TO ACCESS A RESOURCE

(75) Inventors: Kun Yu, Randwick (AU); Hao Wang, Beijing (CN); Wendong Wang, Espoo (FI); Yidong Cui, Beijing (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 13/635,495

(22) PCT Filed: Mar. 26, 2010

(86) PCT No.: PCT/CN2010/071350
§ 371 (c)(1),
(2), (4) Date: Nov. 13, 2012

(87) PCT Pub. No.: WO2011/116528
PCT Pub. Date: Sep. 29, 2011

(65) Prior Publication Data
US 2013/0198811 A1 Aug. 1, 2013

(51) Int. Cl.
*G06F 17/30* (2006.01)
*H04L 29/06* (2006.01)
(52) U.S. Cl.
CPC ............. *H04L 63/08* (2013.01); *H04L 63/104* (2013.01)
(58) Field of Classification Search
CPC ........ G06F 21/604; G06F 21/31; H04L 63/08
USPC .................. 726/1, 4, 28, 5–27; 705/319, 347; 706/47; 707/661–744
See application file for complete search history.

(56) References Cited

U.S. PATENT DOCUMENTS

| | | | | |
|---|---|---|---|---|
| 6,892,307 B1 * | 5/2005 | Wood et al. | ......................... | 726/8 |
| 7,055,040 B2 * | 5/2006 | Klemba | ............. | G06Q 30/0601 380/277 |
| 7,085,925 B2 * | 8/2006 | Hanna | ................... | H04L 9/3263 713/155 |
| 7,272,625 B1 * | 9/2007 | Hannel et al. | ................. | 709/200 |
| 7,716,140 B1 * | 5/2010 | Nielsen et al. | ................ | 705/319 |
| 7,725,525 B2 * | 5/2010 | Work | ..................... | G06Q 10/10 707/726 |

(Continued)

FOREIGN PATENT DOCUMENTS

| CN | 1691039 A | 11/2005 |
|---|---|---|
| CN | 101336430 A | 12/2008 |

(Continued)

OTHER PUBLICATIONS

Crminati Barbara, Enforcing access control in web-based social networks, ACM Journal, vol. 13, pp. 6:1-38.*

(Continued)

*Primary Examiner* — Michael R Vaughan
*Assistant Examiner* — Viral Lakhia
(74) *Attorney, Agent, or Firm* — Ditthavong & Steiner, P.C.

(57) ABSTRACT

An approach is provided for providing a trust level to access a resource. A system receives a request at a device, from a first user, to access a resource associated with a second user. The resource is further associated with a predetermined privacy level. The system calculates a trust level between the first user and the second user based, at least in part, on a trust metric. The system then determines whether the trust level meets the predetermined privacy level and grants an access right to the resource based, at least in part, on the determination.

15 Claims, 12 Drawing Sheets

(56) References Cited

U.S. PATENT DOCUMENTS

| | | | |
|---|---|---|---|
| 7,821,926 B2* | 10/2010 | Hannel | H04L 63/0218 370/229 |
| 7,886,334 B1* | 2/2011 | Walsh et al. | 726/1 |
| 8,121,915 B1* | 2/2012 | Igoe et al. | 705/35 |
| 8,276,207 B2* | 9/2012 | Walsh et al. | 726/26 |
| 8,387,122 B2* | 2/2013 | Toomim | G06F 21/6218 713/183 |
| 8,423,762 B2* | 4/2013 | Aull | H04L 9/3263 380/285 |
| 8,464,346 B2* | 6/2013 | Barai et al. | 726/25 |
| 8,538,895 B2* | 9/2013 | Appelman et al. | 705/319 |
| 8,549,657 B2* | 10/2013 | Karlson et al. | 726/28 |
| 8,589,482 B2* | 11/2013 | Tiu et al. | 709/203 |
| 8,595,626 B2* | 11/2013 | Brolley et al. | 715/738 |
| 8,874,477 B2* | 10/2014 | Hoffberg | G06Q 10/0631 705/37 |
| 2006/0031313 A1 | 2/2006 | Libbey, IV et al. | |
| 2007/0239684 A1 | 10/2007 | Anderson et al. | |
| 2008/0028436 A1* | 1/2008 | Hannel et al. | 726/1 |
| 2008/0040428 A1* | 2/2008 | Wei et al. | 709/204 |
| 2008/0084875 A1 | 4/2008 | Parkkinen et al. | |
| 2009/0199264 A1* | 8/2009 | Lang | 726/1 |
| 2009/0216859 A1* | 8/2009 | Dolling | 709/218 |
| 2009/0282473 A1* | 11/2009 | Karlson et al. | 726/17 |
| 2009/0288150 A1 | 11/2009 | Toomin et al. | |
| 2009/0319940 A1 | 12/2009 | Flake et al. | |
| 2010/0250497 A1* | 9/2010 | Redlich | F41H 13/00 707/661 |
| 2011/0029398 A1* | 2/2011 | Boudville | 705/26.1 |
| 2011/0035329 A1* | 2/2011 | Delli Santi et al. | 705/347 |
| 2011/0238608 A1* | 9/2011 | Sathish | 706/47 |
| 2012/0030193 A1* | 2/2012 | Richberg et al. | 707/719 |
| 2013/0151300 A1* | 6/2013 | Le Chevalier et al. | 705/7.15 |

FOREIGN PATENT DOCUMENTS

| | | |
|---|---|---|
| CN | 101523852 A | 9/2009 |
| EP | 1591939 A2 | 11/2005 |
| WO | 2007/076297 A2 | 7/2007 |
| WO | 2007076297 A2 | 7/2007 |
| WO | 2007/115209 A2 | 10/2007 |

OTHER PUBLICATIONS

International Search Report and Written Opinion received for corresponding Patent Cooperation Treaty Application No. PCT/CN2010/071350, dated Jan. 6, 2011, 12 pages.

Office Action for corresponding Chinese Application No. 201080065819.6, dated Jul. 24, 2014, 9 pages (English Language Summary Included).

Chinese Office Action for related Chinese Patent Application No. 201080065819.6 dated Mar. 9, 2015, with English-language summary, 7 pages.

Office Action for corresponding Chinese Patent Application No. 201080065819.6, dated Sep. 24, 2015, with English-language summary, 7 Pages.

* cited by examiner

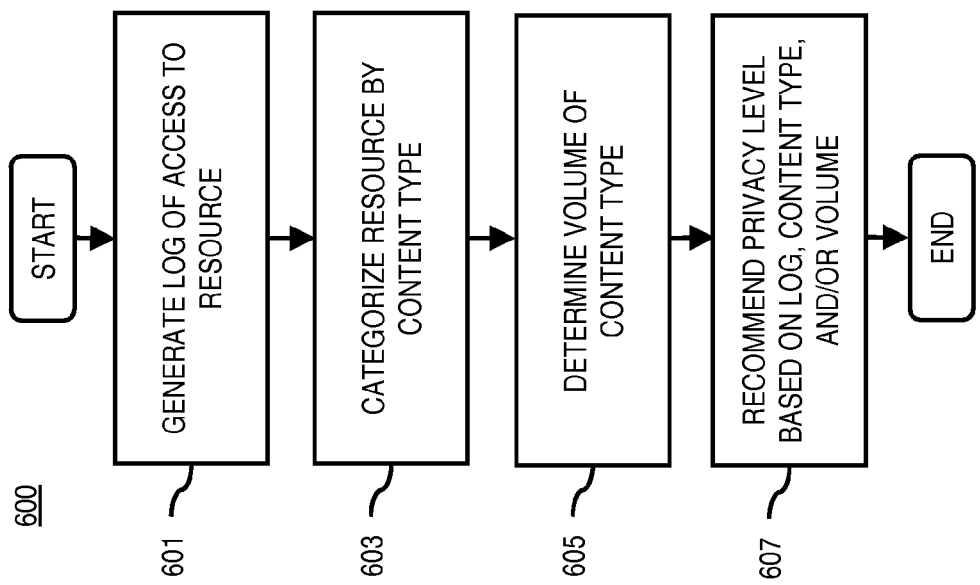

METHOD AND APPARATUS FOR PROVIDING A TRUST LEVEL TO ACCESS A RESOURCE

RELATED APPLICATION

This application was originally filed as PCT Application No. PCT/CN2010/071350 filed Mar. 26, 2010.

BACKGROUND

Service providers (e.g., wireless, cellular, etc.) and device manufacturers are continually challenged to deliver value and convenience to consumers by, for example, providing compelling network services. One area of interest has been the development of social networking services and other services for making connections and sharing content or resources among users. The totality of these connections and relationships among users are commonly known as social graphs. For example, a social graph can be created on a user-by-user basis to represent links created by a particular user over one or more social networking services. However, because social networking services often make it very easy for a user to create such connections, a user's social graph can expand quickly from a core group of close friends to a much larger and potentially cumbersome group (e.g., a group that includes friends of friends, minor acquaintances, or even complete strangers). The increase in the complexity and extent of social graphs (e.g., in one or more social networking services) makes it much more difficult to control access to shared resources and content to protect privacy and ensure that only trusted friends have appropriate access. Accordingly, service providers and device manufacturers face significant technical challenges to enabling users to manage the privacy of shared resources and content as the user's community of social networking friends rapidly grows.

SOME EXAMPLE EMBODIMENTS

Therefore, there is a need for an approach for efficiently providing trust levels to guide the sharing of resources (e.g., content shared over one or more social networking services).

According to one embodiment, a method comprises receiving a request at a device, from a first user, to access a resource associated with a second user. The resource further associated with a predetermined privacy level. The method also comprises calculating a trust level between the first user and the second user based, at least in part, on a trust metric. The method further comprises determining whether the trust level meets the predetermined privacy level. The method further comprises granting an access right to the resource based, at least in part, on the determination.

According to another embodiment, an apparatus comprising at least one processor, and at least one memory including computer program code, the at least one memory and the computer program code configured to, with the at least one processor, cause, at least in part, the apparatus to receive a request at a device, from a first user, to access a resource associated with a second user. The resource further associated with a predetermined privacy level. The apparatus is also caused to calculate a trust level between the first user and the second user based, at least in part, on a trust metric. The apparatus is further caused to determine whether the trust level meets the predetermined privacy level. The apparatus is further caused to grant an access right to the resource based, at least in part, on the determination.

According to another embodiment, a computer-readable storage medium carrying one or more sequences of one or more instructions which, when executed by one or more processors, cause, at least in part, an apparatus to receive a request at a device, from a first user, to access a resource associated with a second user. The resource further associated with a predetermined privacy level. The apparatus is also caused to calculate a trust level between the first user and the second user based, at least in part, on a trust metric. The apparatus is further caused to determine whether the trust level meets the predetermined privacy level. The apparatus is further caused to grant an access right to the resource based, at least in part, on the determination.

According to another embodiment, an apparatus comprises means for retrieving a social graph identifying people associated with a user. The apparatus also comprises means for retrieving a communication history from a device associated with the user. The apparatus further comprises means for determining information regarding a respective occurrence of each identified person in the communication history. The apparatus further comprises means for generating a relevant social graph based, at least in part, on the determined occurrence information.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 6 is a flowchart of a process for recommending a privacy level for a resource, according to one embodiment;

DESCRIPTION OF SOME EMBODIMENTS

Examples of a method, apparatus, and computer program for providing a trust level to access a resource are disclosed.

In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
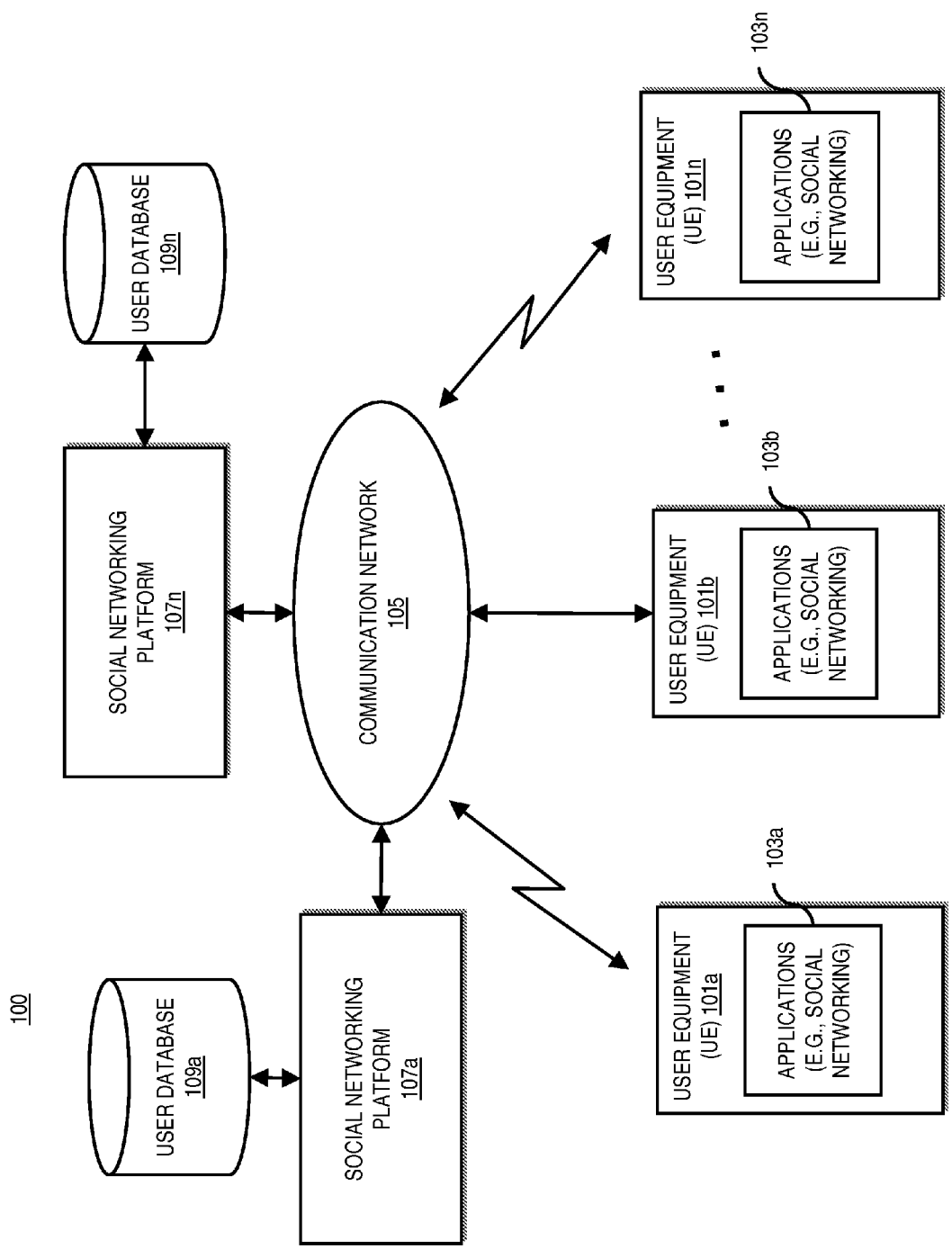
FIG. 1 is a diagram of a system capable of providing a trust level to access a resource, according to one embodiment.

FIG. 1 is a diagram of a system capable of providing a trust level to access a resource, according to one embodiment. As noted previously, the prevalence of social networking services have provided users with a variety of ways to share and access content (e.g., media files, documents, applications, etc.) and other resources (e.g., computing resources in distributed computing, distributed storage solutions, etc.). In fact, it is noted that the social networking services landscape is becoming saturated and new forms of social network services and ways of having relationships established are appearing. As a resource, existing social graphs of users are becoming large and unwieldy. As used herein, the term social graph refers generally to a community or a representation of a community of friends and relationships associated with a user in one or more social networking or similar services. In certain embodiments, a social graph is also a data structure or a group of data structures (e.g., list, table, etc.) that stores connection and relationship information between users (e.g., connections via accounts of users or members of a social networking service). For example, groups (e.g., family, friends, colleagues, co-workers, acquaintances, etc.) may be depicted or described as associations within information stored about the user. Further, social graphs can be extracted from social networking services and/or generated by identifying and linking relationships based on contact information.

As a user's circle of social networking contacts grow, it is becoming difficult to view messages from people on the user's social graph. Further, it is becoming difficult to manage the additions to the user's social graph as well as manage the privacy of status information, shared content and resources, and other similar social networking activities. Traditionally, users manually set and manage the visibility and access to shared resources and content. For example, users can generally identify whether or not some particular content or resource should be shared with a specific group of friends. This manual process, however, is primarily suitable for handling relatively small amounts shared content and/or relatively small amounts of social networking contacts. For example, if the amount of content to be shared and/or the number of other users with whom the user can share such content increases, the burden on the user to maintain such a system is potentially crippling.

Moreover, traditional access control schemes generally are limited in how access is granted to the shared content or resources. More specifically, users often have to decide and set the visibility of personal content manually by either one or two options (e.g., permit or deny access). Additionally, in most cases if a direct friendship does not exist, only a quite limited amount of information can be shared by the users.

To address this problem, a system 100 of FIG. 1 introduces the capability to automatically and intelligently manage access control to shared content and resources of social networks by, for instance, evaluating trust levels based on available trust paths between friends.

In one embodiment, the system 100 also visualizes the relationship among friends, which advantageously helps users to adjust and manage access rights in one or more social networks. More specifically, relies on existing trust relationships among friends to extrapolate trust relationships among the users. In one embodiment, the system 100 relies on the transitive property of trust relationships to infer trust levels between users who do not have a direct or existing relationship. By way of example, if user A trusts user B and user B also trusts user C, the systems infers that user A also trusts user C to some extent. In other words, the system 100 identifies a trust path running from user A to user B to user C and calculates a trust level among any subgroup of the users using any metric or measure of trust, even though there is no predefined or direct relation between user A and user C.

In certain embodiments, the system 100 calculates the trust levels for inferred relationships according to one or more rules. For example, in one embodiment, the trust values decay or diminish when it transfers along the trust path. In the example above, for instance, the trust level between user A and user B is higher than the trust level between user A and user C because there is a higher degree of separation between user A and user C along the trust path. It is contemplated that the reduction or decay in trust levels can be constant (e.g., a specific reduction for each link in the path) or non-constant (e.g., have in greater reduction for more distant nodes or users in the trust path).

In another embodiment, a rule requires that if user A wants to access a resource of user C and there is no direct relationship between the users, there should be at least one trust path from user A to user C (e.g., through user B). If there is no path, the system 100 cannot automatically provide or grant access for user A to access the shared resource of user C.

It is noted that trust values among the users or nodes are important factors for deciding whether a particular user has a sufficient trust level and/or enough rights to access a requested resource. Moreover, there can be many paths from a user to a requested resource. For example, there may be many common friends in a social graph that includes the requesting user and the sharing user along which multiple trust paths can run. In one embodiment, different trust paths can result in difference access rights based on the calculated trust level along the path. If one trust path does not provide a sufficient level of trust to access a shared resource, the system 100 can suggest alternate paths that can potentially achieved the required trust level.

In yet another embodiment, the system 100 can collect or maintain access logs about who accesses or visits a particular user or shared resource of the user. The system 100 can then analyze the log and advise the sharing user on how best to adjust privacy settings to control access. In this way, the system 100 can advantageously optimize both the trust levels of users who access a shared resource and the privacy settings for the shared resource to reduce the burden on the user for manually specifying such settings.

As shown in FIG. 1, user equipment (UEs) 101*a*-101*n* may be utilized to present social networking applications 103*a*-103*n*. These social networking applications 103 can utilize a communication network 105 to communicate to one or more social networking platforms 107*a*-107*n*. The social networking platforms 107 can store user information, content, and other resources in a user database 109*a*-109*n* for sharing with other users or friends. Examples of social networking platforms 107 include social networking websites and services (e.g., Facebook™, Twitter™, MySpace™ etc.), as well as other computing devices (e.g., a server to coordinate communications between UEs 101 such as a chatting service). The user information may include user profiles of users, one or more social graphs of the user as well as associations (e.g., trust levels) with other users. Further, the user information may additionally include updates from the user and other users (e.g., friends), media content (e.g., images, video, audio, etc.), communications, game content, etc.

As previously noted, the social networking application 103 may be utilized by the UE 101 to provide social networking services to the user. Other applications (e.g., a messaging application, communication history application, contacts application, etc.) may be utilized to communicate, via the UE 101, with other people. In one embodiment, these people may be associated with unique identifiers (e.g., e-mail address, messaging alias identifier, phone number, address, etc.). As such, the UE 101 can store the identifiers as associated with particular communications in, for instance, a communication history or access log. With these identifiers, the social networking application 103 can query social networking platforms 107 to determine if the contacts are part of respective social networking services. For example, the social networking application 103 can utilize an application programming interface (API) of the social networking platforms 107 to determine if the person associated with the communications is a member of the social networking service or services. As part of the query, the user may provide a user name and/or password for social networking services to access the social connection information (e.g., the social graph) within the respective services.

By way of example, the social networking platform 107 retrieves and checks a communication history of the UE 101 to determine one or more occurrences of communications between the user and other users. In certain embodiments, contact information for a person may be stored in a contact database (e.g., a phonebook database, contact list, etc.) and used as part of the trust calculation for the respective contact. As such, the communications using different modes of communication (e.g., e-mail, phone call, chat message, SMS, etc.) can be correlated to determine repeating occurrences of communication between the user and other people (e.g., repeated communications can be at least one metric of a trust relationship). In certain embodiments, repeat occurrences above a certain threshold number of occurrences can be utilized to trigger and increase the trust level between two users. In this way, the person's contact information is utilized to query the social networking services to determine whether that person is part of the user's social graph and should have more access rights to shared content. The social graph, for instance, can be specific to each social networking service to which the user belongs. Further, if the person is not part of the user's social graph for the particular social networking service, the social networking application 103 can add the user to the user's social networking graph for the service after, for instance, calculating trust levels between the person and the user from common friends or contacts in the social graph. In one embodiment, if the person is a member of the social networking service, the user can invite the person to be a member of the user's social graph. If the person lacks membership to the social networking service, the social networking application 103 can send an invitation to the person to join the social networking service via one of modes of communication (e.g., e-mail).

In certain embodiments, the social networking application 103 may access social graphs associated with the user. The social graphs can be tied to individual social networking services, be a combination of graphs of multiple social networking services, be tied to contacts associated with the user without a social networking service, or a combination thereof. The social networking application 103 can generate or infer trust paths between users based on one or more of the social graphs. In one embodiment, to generate the relevant social graph, the social networking application 103 retrieves the communication history from the UE 101 (e.g., if the trust metric is based at least in part on frequency of communication). Then, the communication history is parsed to determine one or more occurrences or patterns of occurrences of communications between the user and other people. The people associated with the social graph(s) that are part of the occurrences or patterns of occurrences may be flagged, sorted, etc. in a new relevant social graph that describes potential trust paths. In one example, the trust paths may include people that have been in recent communications with the user. In another example, the relevant social graph flags people that have been in frequent communications with the user as having potential trust paths. In yet another example, the potential trust paths may be ranked based on the communications (e.g., recentness of communication, frequency of communication, algorithms accounting for frequency and recentness of communications, intimacy, topics of communication, etc.). Intimacy and/or topics of communication may be flagged based on monitoring communications between users for keywords. For example, communications with positive words like the word "love" can be associated with a strong connection or trust relationship between users while communications with negatives words or phrases such as "I hate you" can be associated with a negative connection or less trust between users.

The trust levels may be used to provide access to shared resources and/or perform other actions with respect to social networking and/or communication functions. By way of example, the relevant social graph may be utilized to filter information to present to the user via the social networking application 103. The information may include status updates and feeds, messages, communications between other members of the social graph, a combination thereof, etc. Alternatively or additionally, the information may be ranked and sorted to be presented to the user via the social networking application 103. As such, certain information may be highlighted or otherwise marked to stand out or have higher priority in presentation (e.g., status updates associated with a person that the user has recently had real life contact with).

In certain embodiments, the social networking application 103 can be utilized to generate a master social graph that includes information from multiple other social graphs, relationships, and/or trust levels. For example, the master social graph can include information that a particular person is a friend in a first social networking service, a colleague in another social networking service, and not linked to the user in other social networking services. Each of these scenarios may, in turn, be associated with different trust levels and provide for different potential trust paths. In another example, another person may be a contact that has contact information stored in a contact list of the UE 101 including relationship status (e.g., wife, husband, family, sister, brother, child, cousin, colleague, employer, friend, classmate, high school classmate, college classmate, acquaintance, etc.). These relationships or social connections may be utilized to group one or more sets of people in the master social graph or other social graphs together to form potential trust paths.

In certain scenarios, a person may belong to more than one group. For example, a person may be a member of a user's family group and high school group. The people in these groups can further be associated in a social graph based on relationships (e.g., compatibility) with each other (e.g., how much one person likes another person in the social graph or group). These relationships may further be presented via sounds (e.g., sounds indicating sympathy or antipathy) or links between the users (e.g., a link showing magnetism or dislike between the people). The social networking application 103 or social networking platform 107 can determine the compatibility between people by searching user profiles, opinions written in forums, and other observable behavior. For example, two people who agree on opinions and have common user profile elements can be considered compatible. In one embodiment, the compatibility between users is another metric of trust.

As shown in FIG. 1, the system 100 comprises a user equipment (UE) 101 having connectivity to social networking platforms 107 and other UEs 101 via a communication network 105. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like.

The UE 101 is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), or any combination thereof. It is also contemplated that the UE 101 can support any type of interface to the user (such as "wearable" circuitry, etc.).

By way of example, the UEs 101 and the social networking platforms 107 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
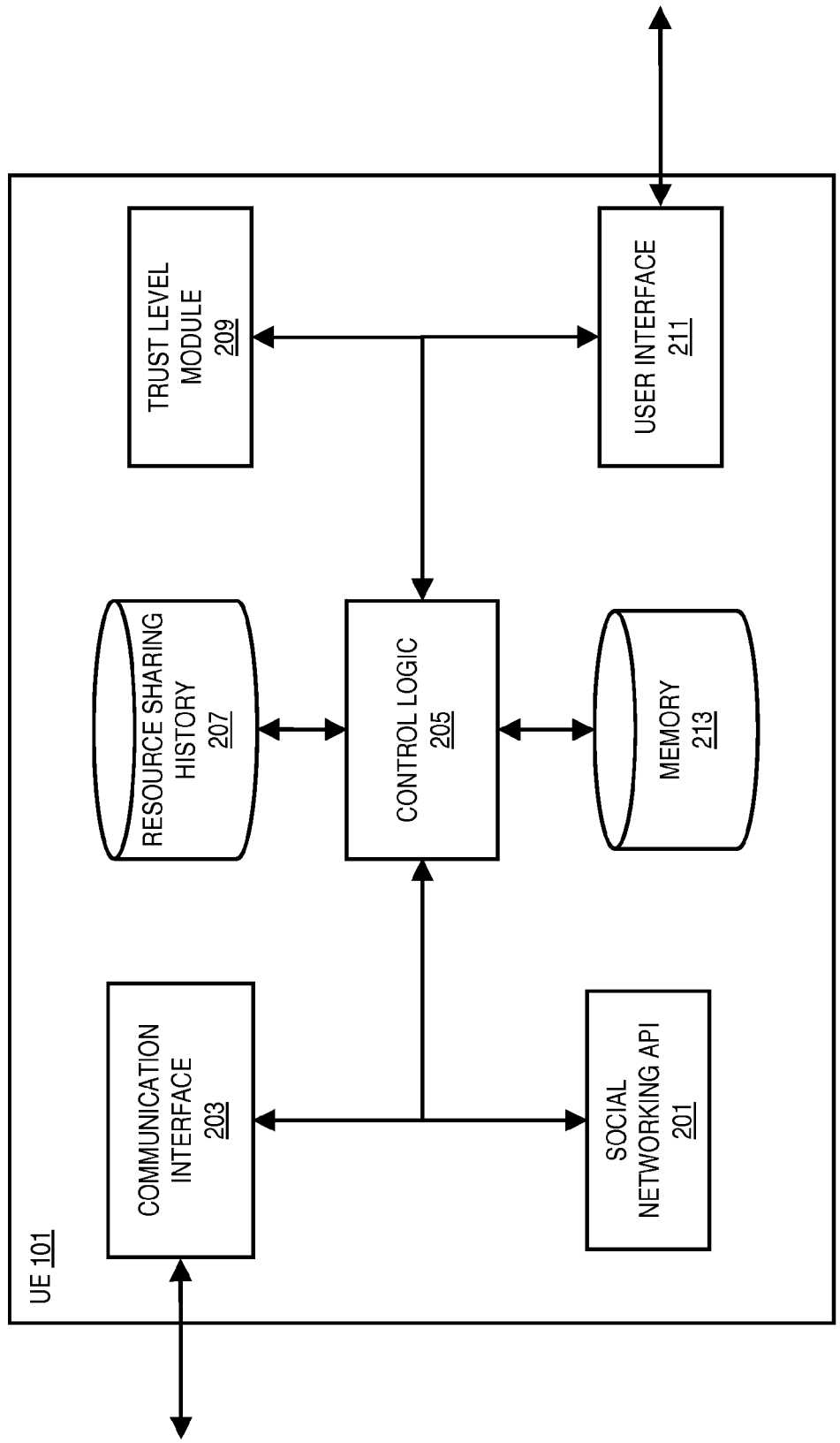
FIG. 2 is a diagram of the components of user equipment capable of providing a trust level to access a resource, according to one embodiment.

FIG. 2 is a diagram of the components of user equipment capable of providing a trust level to access a resource, according to one embodiment. It is contemplated that the functions of these components may be combined in one or more components or performed by other components of equivalent functionality. In this embodiment, the UE 101 includes a social networking API 201 to connect to social networking platforms 107, a communication interface 203 to communicate over a network, control logic 205 to control the runtime of applications executing on the UE 101, a resource sharing history 207, a trust level module 209, a user interface 211 to output information and receive input, and a memory 213.

The control logic 205 can run applications (e.g., a social networking application 103) on the UE 101. The applications can be stored in the memory 213 while executing. These application may utilize the user interface 211 to interact with users, a communication interface 203 to interact with other UEs 101 (e.g., via a communication network 105), and a social networking API 201 that may be utilized to interact with the communication interface 203 to interact with social networking platforms 107. The social networking API 201 may be used by the control logic 205 to query the social networking platforms 107 for information (e.g., querying for shared resources, querying social graphs associated with the user, querying social services to determine whether a person associated with contact information is a member of the social service, etc.). Further, the social networking API 201 may be utilized to receive and format other services from the social networking platforms 107 (e.g., status updates, communications between members of the social networking service, presence information associated with users of the service, etc.).

The communication interface 203 may include multiple means of communication. For example, the communication interface 203 may be able to communicate over SMS, internet protocol, instant messaging, voice sessions (e.g., via a phone network), or other types of communication. The communication interface 203 can be used by the control logic 205 to communicate with other UEs 101, the social networking platforms 107, and other devices. In some examples, the communication interface 203 is used to transmit and receive information using protocols and methods associated with the social networking API 201.

In one embodiment, a UE 101 includes a user interface 211. The user interface 211 can include various methods of communication. For example, the user interface 211 can have outputs including a visual component (e.g., a screen), an audio component, a physical component (e.g., vibrations), and other methods of communication. User inputs can include a touch-screen interface, a scroll-and-click interface, a button interface, etc. In certain embodiments, the user interface 211 may additionally have a vocal user interface component. As such, a text-to-speech mechanism may be utilized to provide textual information to the user. Further, a speech-to-text mechanism may be utilized to receive vocal input and convert the vocal input into textual input. Moreover, the user interface 211 may be utilized to present social networking information as further detailed in the description of FIGS. 6A-6D. As such, the user interface 211 may be utilized to present content associated with the social networking application 103.

In certain embodiments, the social networking application 103 or other applications (e.g., a communication application, messaging application, etc.) execute on the control logic 205 and utilize a resource sharing history 207 and/or trust level module 209 to determine and disseminate trust levels, trust paths, access rights, and/or other social information to the user via the user interface 211. As noted above, the trust level module 209 may be utilized to determine a privacy level associated with a shared resource of a social networking user, calculate a trust level between a requesting user of the resource and a sharing user of the user, and to grant access rights to the resource to the requesting user if the trust level meets the requirements of the privacy level associated with the resource. The trust level calculations may be stored in memory 213 and distributed via the social networking API 201 and/or communication interface 203. Further, the social networking API 201 may be invoked to retrieve social graphs from one or more social networking platforms 107 or other devices accessible via the communication network 105.

Further, as the user utilizes the UE 101 to access shared resources via the user interface 211 and communication interface 203, a resource sharing history 207 is compiled. The resource sharing history 207 represents a log of access to one or more shared resources. In one embodiment, the resource sharing history 207 identifiers users and/or devices that have accessed or that have access rights to particular shared resources. The resource sharing history 207 can also include trust levels associated with the users that have accessed the resources. In this way, the UE 101 can recommend the appropriate trust levels for different categories of resources (e.g., content type, volume of data, entities accessing the resources, and the like. As such, in certain embodiments, the social graph module 209 is a means for calculating trust levels between users to provide access to a corresponding resource. Further, the control logic 205 may be a means for utilizing the resource sharing history 207 and trust level module 209. For example, the control logic 205 can utilize the resource sharing history 207 to determine multiple trust paths between users and to select a path that can enable the user to access a shared resource associated with a predetermined privacy level.

Figure 3:
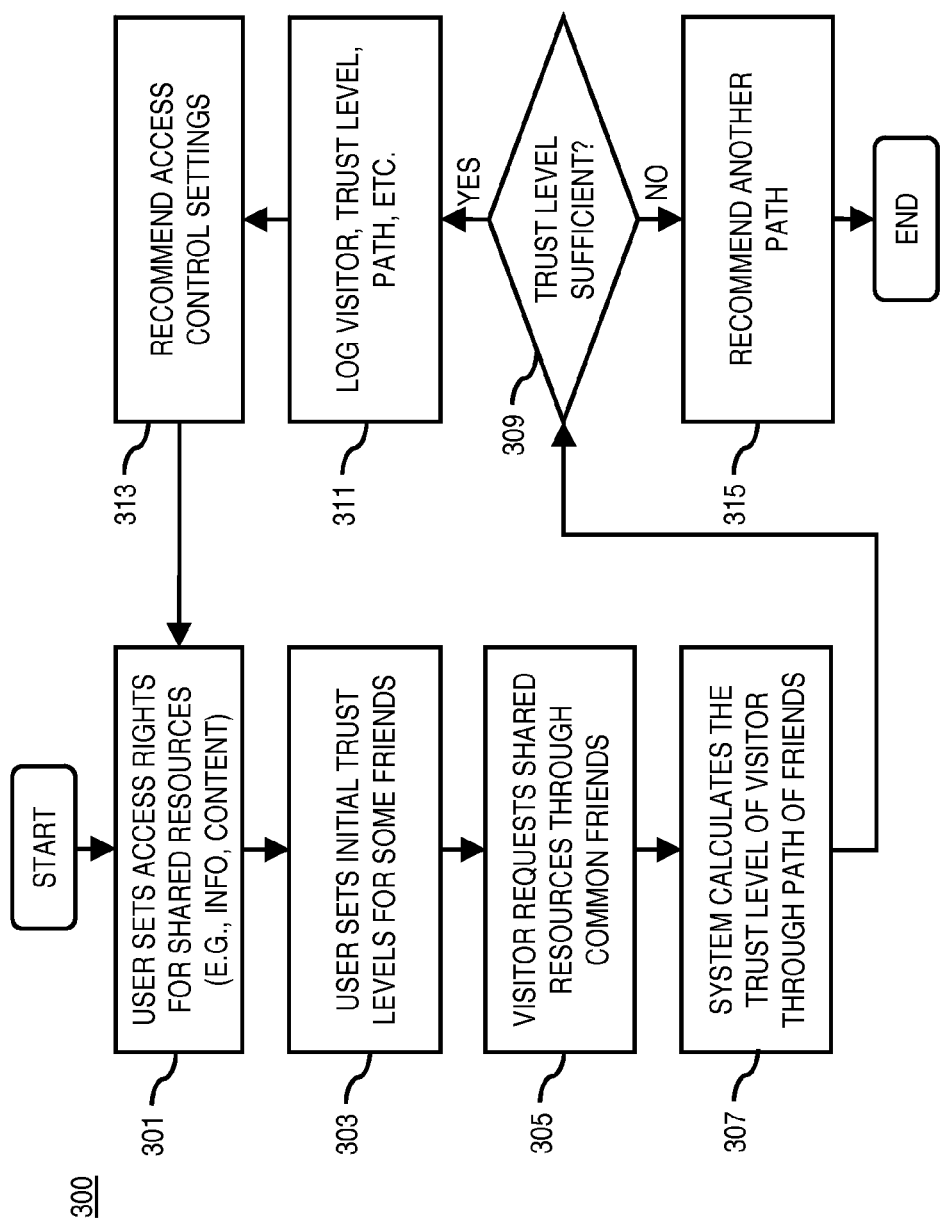
FIG. 3 is a flowchart of a overall system process for providing a trust level to access a resource, according to one embodiment.
Figure 9:
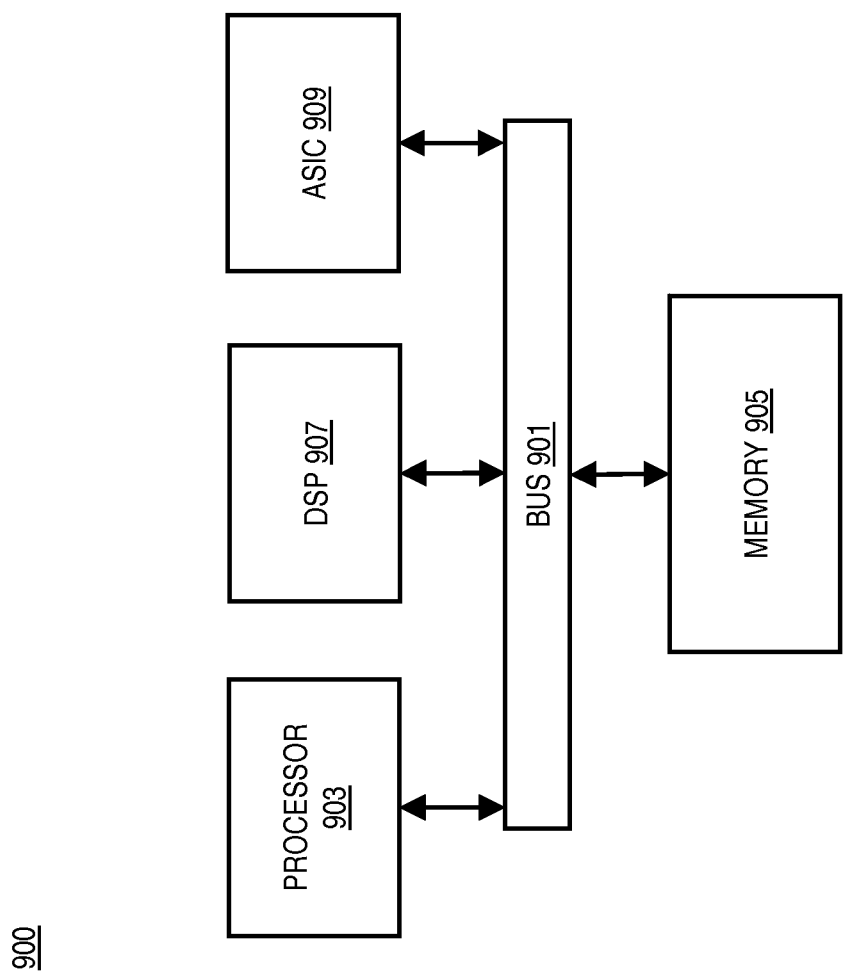
FIG. 9 is a diagram of a chip set that can be used to implement an embodiment of the invention.

FIG. 3 is a flowchart of an overall system process for providing a trust level to access a resource, according to one embodiment. In one embodiment, the control logic 205 of one or more UEs 101 (e.g., a UE 101 associated with sharing user, a UE 101 associating with a requesting or visiting user) performs the 300 and is implemented in, for instance, a chip set including a processor and a memory as shown in FIG. 9. As such, control logic 205 can provide means for accomplishing various parts of the process 300 as well as means for accomplishing other processes in conjunction with other components. In one embodiment, a social networking application 103 can be executed on the control logic 205 to present social networking information, such are shared resources, social communications, status updates, etc. at the UE 101 (e.g., via a user interface screen). In certain embodiments, the social networking application 103 can be an active application or a background application running on the UE 101. Additionally or alternatively, the social networking application 103 can run as wallpaper in the background of the UE 101.

In step 301, a sharing user sets via the control logic 205 of the UE 101 access rights for one or more shared resources. In one embodiment, the shared resources are associated with the social networking application 103. However, it is also contemplated that the approach described herein is also applicable to other applications or services for sharing content, resources, and the like. More specifically, in one embodiment, the access rights of a shared resource are specified according to one or more three categories (e.g., public, personal, and private). Each of the categories and/or privacy levels is further associated with a specific minimum trust level that is met before access to the shared resource is provided. For simplicity and ease of calculation, the privacy level and trust level is normalized to a value between 0 and 1. However, it is contemplated that the levels need not be normalized or can be normalized to any range.

In this example, the public category is used to mark content that is available generally and, therefore, requires a relatively low trust level to access (e.g., a trust level of 0.1). This information may include, for instance, a screen name or other public identifier. The personal category is used to mark content that provides slightly more identification of the user (e.g., a city of origin) and, therefore, requires a higher trust level to access (e.g., a trust level of 0.4). Finally, the private category is used to mark the most sensitive content (e.g., home phone, birth date, etc.), and, therefore, requires a highest level of trust (e.g., a trust level of 0.8). Although the various embodiments are discussed with respect to three privacy levels, it is contemplated any number of privacy levels may be specified.

Next in step 303, the sharing user (also via the control logic 205 of the UE 101) sets initial trust levels for at least one or more of the user's friends. For example, the user may manually specify trust levels for just the closest friends. In this way, the control logic 205 can use the initial trust levels against, for instance, the social graphs of other users to determine common contacts and potential trust paths. In one embodiment, the user specify one or more users for inclusion in either a whitelist or a blacklist, wherein the whitelist represents users are always trusted for access and the blacklist represents users who are never trusted for access to the resource.

In one embodiment, the sharing user need not manually set the privacy levels (e.g., trust threshold levels) or any other parameters. Instead, a default privacy level setting may fit in with most users. For example, different categories or types of content can be mapped to the privacy level based on general knowledge and experience. Additionally, trust levels of friends may be inferred from other input (e.g., communication history, resource sharing history, etc.).

In step 305, a visiting or requesting user via the control logic 205 of the UE 101 may request access to a shared resource of the sharing user. In this example, the requesting user does not have a previous direct relationship (e.g., friend status, etc.) with the sharing user. By way of example, the requesting user may have reached the sharing user's profile information or sharing page by clicking or surfing through one or more other users common to both the sharing and requesting users.

On receiving the request, the control logic 205 calculates a trust level between the requesting user and the sharing user, as described in more detail below with respect to FIGS. 4 and 7A (step 307). For example, the control logic 205 determines a trust path running from the requesting user to the sharing user through the one or more other users. For each link between any two users in the path, the control logic 205 calculates a link trust level according to a predetermined trust metric. It is noted that the calculation can use any trust metric (e.g., a trust metric based on frequency communication, history of resource sharing, etc.) that is normalized to a number between 0 and 1. In one embodiment, the each link trust value is multiplied with the next link trust value in the path to generate a path trust value. In certain embodiments, a decay factor is also introduced and multiplied with the path trust value. The final product is then used as the trust value of the visiting user.

Next, the calculated trust value is compared against the privacy level associated with the requested resource (step 309). If the trust level is sufficient to meet the corresponding privacy level, the control logic 205 grants access rights to the resource. In addition, the control logic 205 logs the visiting user, the user's associated trust level, trust path, and the like (step 311). As described previously, the control logic 205 can then use the log to recommend access control settings (e.g., privacy levels and trust levels) associated with the visiting user and/or the resource (step 313). If the trust level is not sufficient, the control logic 205 recommends another trust path that may result in a trust value that can meet the privacy level (step 315). If no path is available, the control logic 205 may deny the access request and/or alert the sharing user and request manual approval to grant access to the resource.

Figure 4:
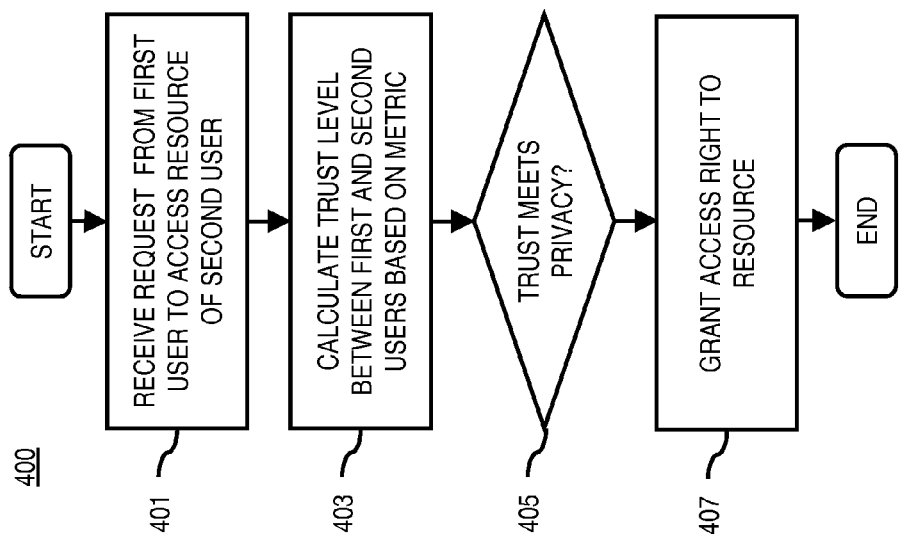
FIG. 4 is a flowchart of a process for granting an access right to a resource based on a trust level, according to one embodiment.

FIG. 4 is a flowchart of a process for granting an access right to a resource based on a trust level, according to one embodiment. In one embodiment, the control logic 205 of the UE 101 performs the process 400 and is implemented in, for instance, a chip set including a processor and a memory as shown FIG. 9. As such, control logic 205 can provide means for accomplishing various parts of the process 400 as well as means for accomplishing other processes in conjunction with other components. In one embodiment, a social networking application 103 can be executed on the control logic 205 to present social networking information, such as social communications, status updates, etc. at the UE 101 (e.g., via a user interface screen). The process 400 provides a more detailed description of portions of the process 300 of FIG. 3.

In step 401, the control logic 205 receives a request from a first user to access a resource (e.g., content) associated with a second user. This request may be signaled for instance over the social networking applications 103, when the first user accesses a page of the second user's profile. As described above, the request triggers a calculation and/or determination of the trust level between the first and second users based on a trust metric (step 403).

In one embodiment, the metric may be based on a frequency of content of communication. For example, in social network theory, there is the concept of one or more centrality nodes through which a majority of trusted communications flow. For example, a traditional example of a centrality node is a patriarch of a family who everyone entrusts with information and whose communications other nodes trust in turn. By evaluating communication history of various nodes, the control logic 205 can identify as part of its trust determination whether a particular node has characteristics of a centrality node. Accordingly, in one embodiment, the control logic 205 retrieves a communication history and/or resource sharing history 207 from the UE 101, which is associated with the first user. The first user may have personal information stored in the memory 213. Moreover, the communication history may further include communication information of the user and other people such as voice sessions such as a phone call, text communications such as a Short Message Service (SMS), Multimedia Messaging Service (MMS), e-mail, chat sessions, video communications, communications via another social networking service, e-mail, chat sessions, video communications, etc. Further, the communication history may include time information as to when the user communicated with a particular person and the type of communication. Moreover, the communication history can include statistics of the communications as well as contact information associated with the people (e.g., a phone number, a messaging alias, a name, etc.).

Then, the control logic 205 provides a means for determining occurrence information regarding a respective occurrence of each identified person in the communication history (step 305). Algorithms (e.g., artificial intelligence, neural networks, and the like) may be implemented to determine an occurrence. In certain embodiments, an occurrence is a determination from the communication history that sufficient contact was made between the user and the identified person. For example, an occurrence may be one communication to the identified person, an outgoing communication to the identified person, an incoming communication from the identified person, a set threshold number of communications with the identified person, a set threshold number in the frequency of communication to the identified person, the recentness of communications with the identified person, a combination thereof, or the like.

Further, the control logic 205 selects a trust path from the first user to the second user based, at least in part, on the determined occurrence information and/or other social networking information. This occurrence information can then be used to calculate a trust level for the first user to access the resource of the second user. As described with respect to FIG. 3, if the calculated trust level meets the predetermined privacy level of the requested resource (step 405), the control logic 205 grants the first user access rights to the shared resource of the second user (step 407).

Figure 5:
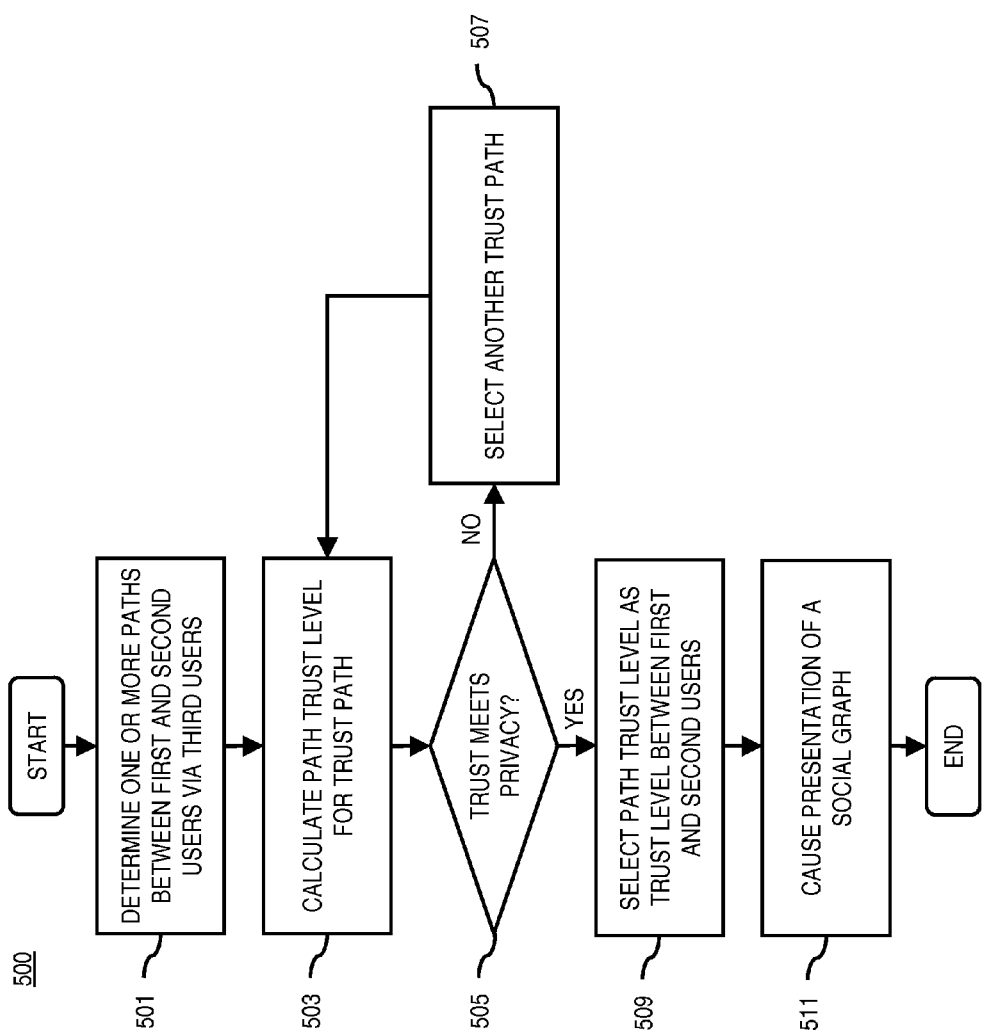
FIG. 5 is a flowchart of a process for determining multiple trust paths to access a resource, according to one embodiment.

FIG. 5 is a flowchart of a process for determining multiple trust paths to access a resource, according to one embodiment. In one embodiment, the control logic 205 of the UE 101 performs the process 500 and is implemented in, for instance, a chip set including a processor and a memory as shown FIG. 9. In step 501, the control logic 205 determines one or more trust paths between the first user and the second user via one or more other third users. In one embodiment, the third users are users that may be common contacts of the first user, the second user or a combination thereof. Each path represents a different combination of one or more of the third users that form relationships linking the first user to the second user even when the first user and the second user have no direct relationship. Depending on the number on third users, it is noted that generally it is anticipated that there can be up to six or seven different trust paths that can be evaluated. As part of step 401, the control logic 205 identifies all available trust paths. In one embodiment, the trust path with the fewest number of links or intervening third users is called the direct trust path (DTP). In one embodiment, the control logic 205 may prioritize evaluation of the DTP before other trust paths.

Accordingly, in step 503, the control logic 205 calculates the path trust levels for the identified trust paths according the process described with respect to FIGS. 3 and 4. If the calculated path trust level does not meet the privacy level of the requested resource (step 505), the control logic 205 selects another of the identified trust path (step 507) and recalculates the trust level. In certain embodiments, the control logic 205 can determine trust levels for all possible paths before making a determination against the privacy level of the requested resource.

If the path trust level meets the privacy level, the control logic 205 can select the path trust level as the trust level between the first user and the second user (step 509). If multiple path trust levels meet the privacy level, the control logic 205 may select the representative trust level using any appropriate criteria or algorithm. For example, the control logic 205 may select the trust level of the path that is the most direct or has the fewest number of intervening users. As another example, the control logic 205 may select the path corresponding to the highest calculated path trust level. On selection of the representative trust level, the control logic 205 can cause presentation of a social graph of at least the first user, the second user, and any intervening third users (step 511). Example depictions of the social graph are described with respect to FIGS. 7A-7C below.

FIG. 6 is a flowchart of a process for recommending a privacy level for a resource, according to one embodiment. In one embodiment, the control logic 205 of the UE 101 performs the process 600 and is implemented in, for instance, a chip set including a processor and a memory as shown FIG. 9. As such, control logic 205 can provide means for accomplishing various parts of the process 600 as well as means for accomplishing other processes and may be utilized in conjunction with other components. As noted in above, a social networking application 103 can be executing on the control logic 205. As such, social networking information, such as social communications, status updates, etc. may be presented to a user of the UE 101 (e.g., via a screen).

At step 601, the control logic 205 generates a log of access to a particular resource to identify users and their respective trust levels that have requested the resource. In one embodiment, the log represents an accumulation of usage with respect one or more resources. The control logic 205 can then categorize the resources according to content type (step 603). For example, the content type can relate to the privacy level categories discussed previously (e.g., public, personal, and private). The content type may also describe the characteristics of the resource (e.g., media files, documents, etc.). It is contemplated that the content type may be classified according to any criteria (e.g., subject, associated people, etc.).

After classification, the control logic 205 can determine the volume or relative volume of requests, access grants, denials, etc. of each content type (step 605). Based, at least in part, on the log, categories, and volume, the control logic 205 can dynamically update the privacy of levels of the respective resources or modify the trust levels of respective users and make recommendations accordingly (step 607). For example, the privacy level of a resource can be increased if more and more access requests to the particular resource or content is denied (e.g., implying that the privacy level may be set too stringently). Similarly, the trust level of any peers or users who want access to the resources can be updated based on the usage information as well. For example, if more and more access requests from user B for private content of user A are accepted, the trust level of user B with respect to user A can be increased. Thus end users need not know or set the absolute values of their content access thresholds because "relative trust" is typically enough for users to adapt and use the system 100 as described herein.

Figure 7A:
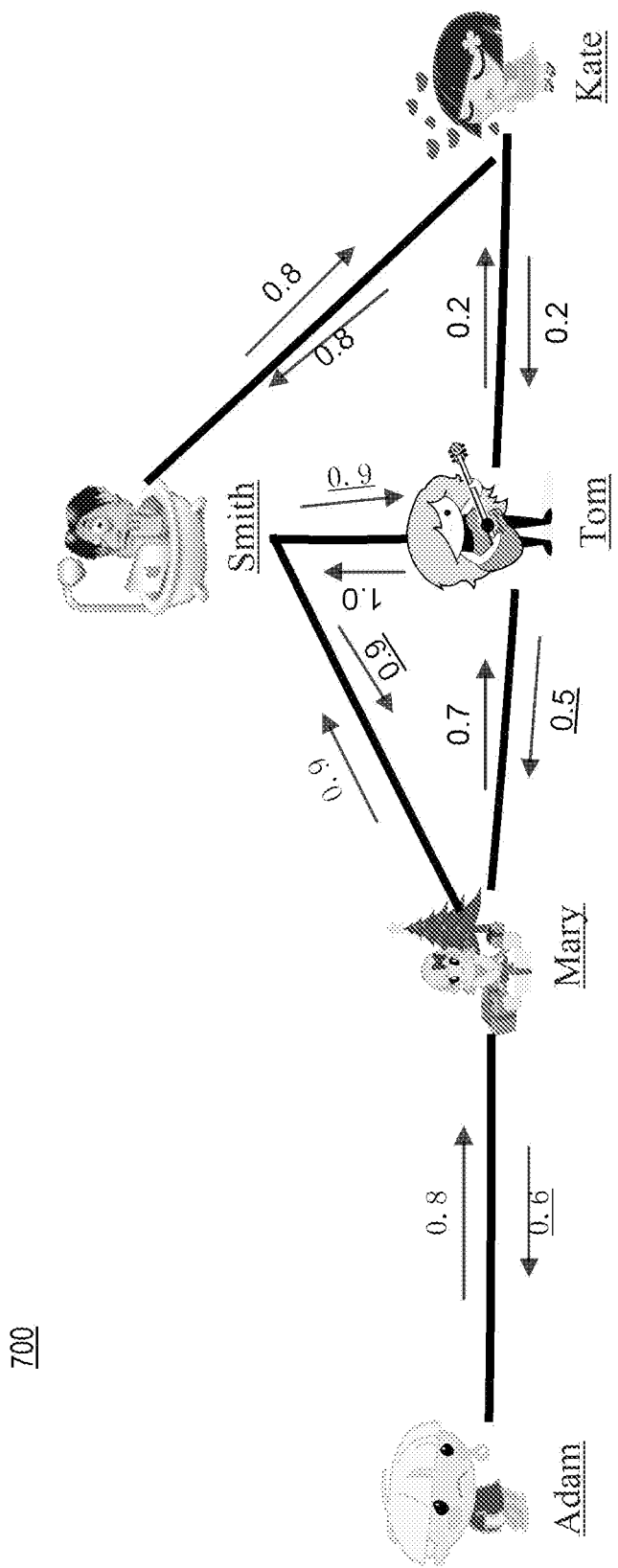
FIGS. 7A-7C are diagrams of social graphs depicting trust levels for accessing a resource, according to various embodiments.
Figure 7B:
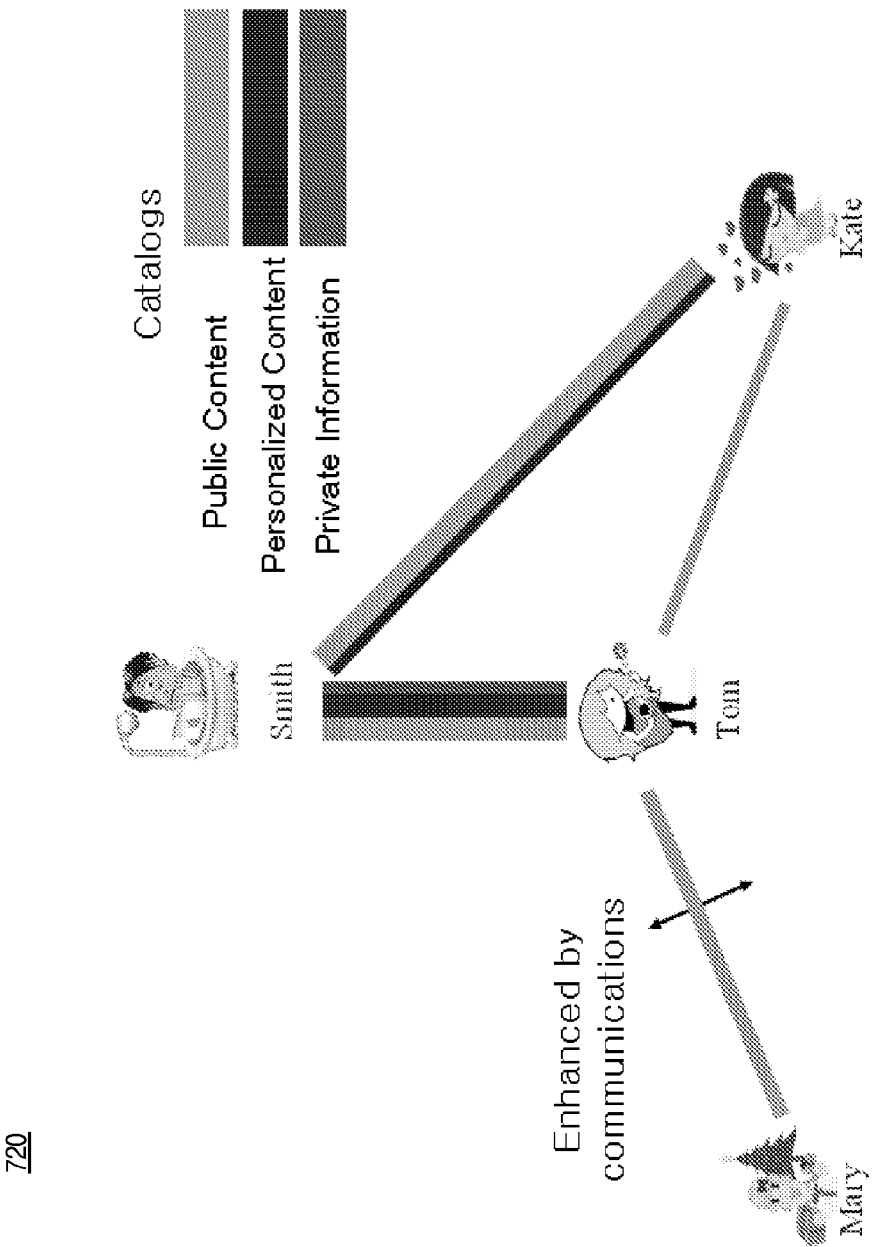
Figure 7C:
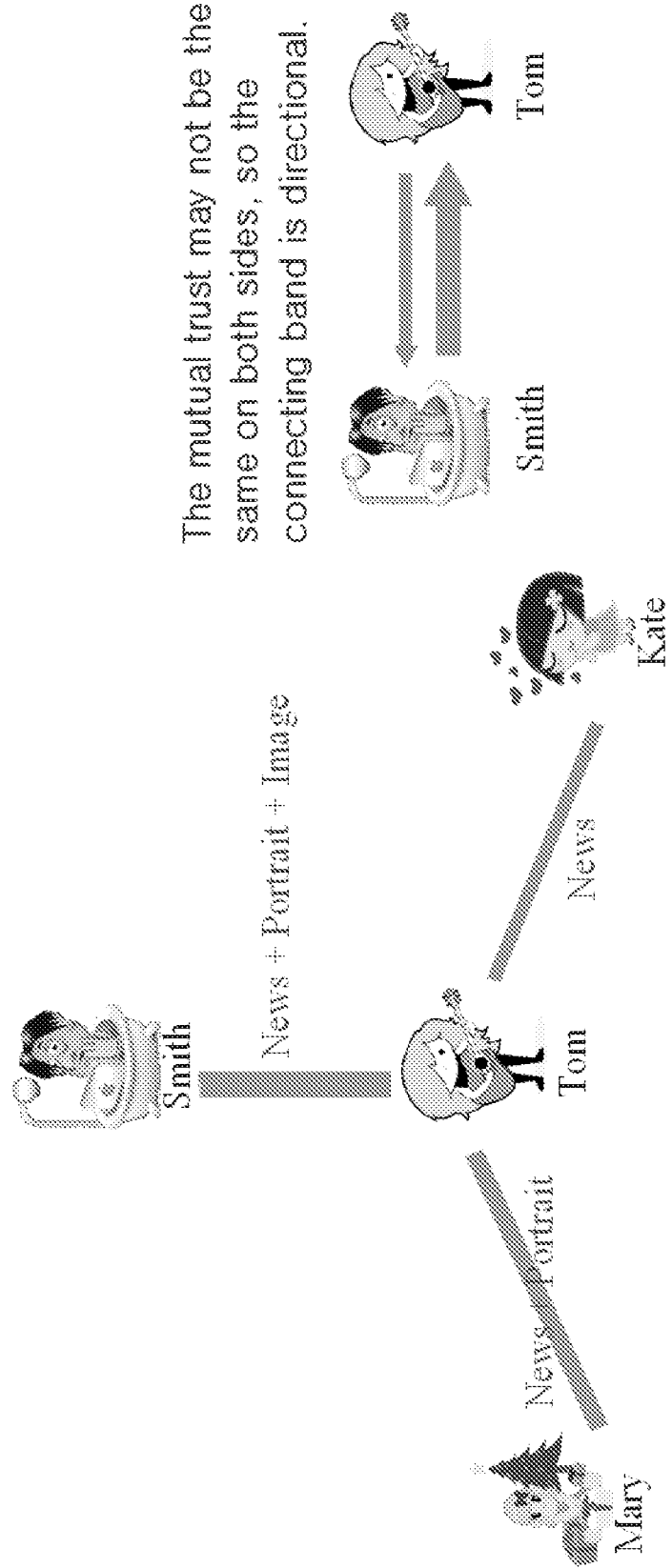

FIGS. 7A-7C are diagrams of social graphs depicting trust levels for accessing a resource, according to various embodiments. FIG. 7A depicts a social graph illustrating different trust levels among different users a social network. In the social graph 700, the trust relationship between each user is bidirectional, meaning that the trust values between two friends need not be identical. For example, the trust level from Adam to Mary is 0.8, whereas the trust level from Mary to Adam is 0.6 person, indicating that Mary trusts Adam more than Adam trusts Mary in return.

For illustration, it is assumed that Adam is sharing a set of photographs over the social network and has set a corresponding privacy level of greater than 0.2 (not shown). If Kate were to try to access the photos, Kate can follow the direct trust path of Kate->Tom->Mary->Adam. Based on this trust path, here calculated trust level would be 0.2×0.7×0.8=0.112. This trust level, however, is below Adam's set privacy level of 0.2. As a result, Kate is denied permission to access the Adam's photographs. However, the system may recommend instead the trust path from Kate->Smith->Mary-Adam, or Kate->Smith->Tom->Mary->Adam, which both result in trust levels greater than the target 0.2. Although a decay function is not applied in this example, it is contemplated that different forms of transition functions can be used to determine the decline of trust levels/access rights in moving along the path from Kate to Adam.

FIG. 7B depicts a social graph mapped to the access control of specific content. In the social graph 720, three different categories of contents are represented in different shades. For the user Tom, he can see from the graph 720 to what extent others could access his content or resources. If the trust level is low, his friends may only view public content (not sensitive) content from him. Mary and Kate are examples of friends at this low trust level. Accordingly, they can only access public content from Tom. As the trust level is incrementally upgraded between close friends, some personal or private information can be shared, as depicted between Smith and Tom. It is noted that the social graph 720 is depicted from the perspective of Tom and that the trust relationship may be different from the perspective of any of the other users because of the bidirectional nature of the trust relationships.

FIG. 7C depicts a social graph 740 for refining privacy control. For example, in this example, the user may scrutinize the respective content categories (e.g., News, Portrait, Image) to see what is shared with a specific friend. The width of the band between each friend is a primary indicator of how much public content within the specific category is shared with each friend. In this interface the user can alter the width of the respective band to alter the amount or volume of content in the particular category that is shared. As with the trust relationship, the relative widths of the band can be different in each direction as shown with respect to Smith and Tom. In this example, Smith is sharing more content with Tom than Tom is with Smith as indicated by the width of the two directional bands between them.

The processes described herein for providing a trust level to access a resource may be advantageously implemented via software, hardware, firmware or a combination of software and/or firmware and/or hardware. For example, the processes described herein, including for providing user interface navigation information associated with the availability of services, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 8:
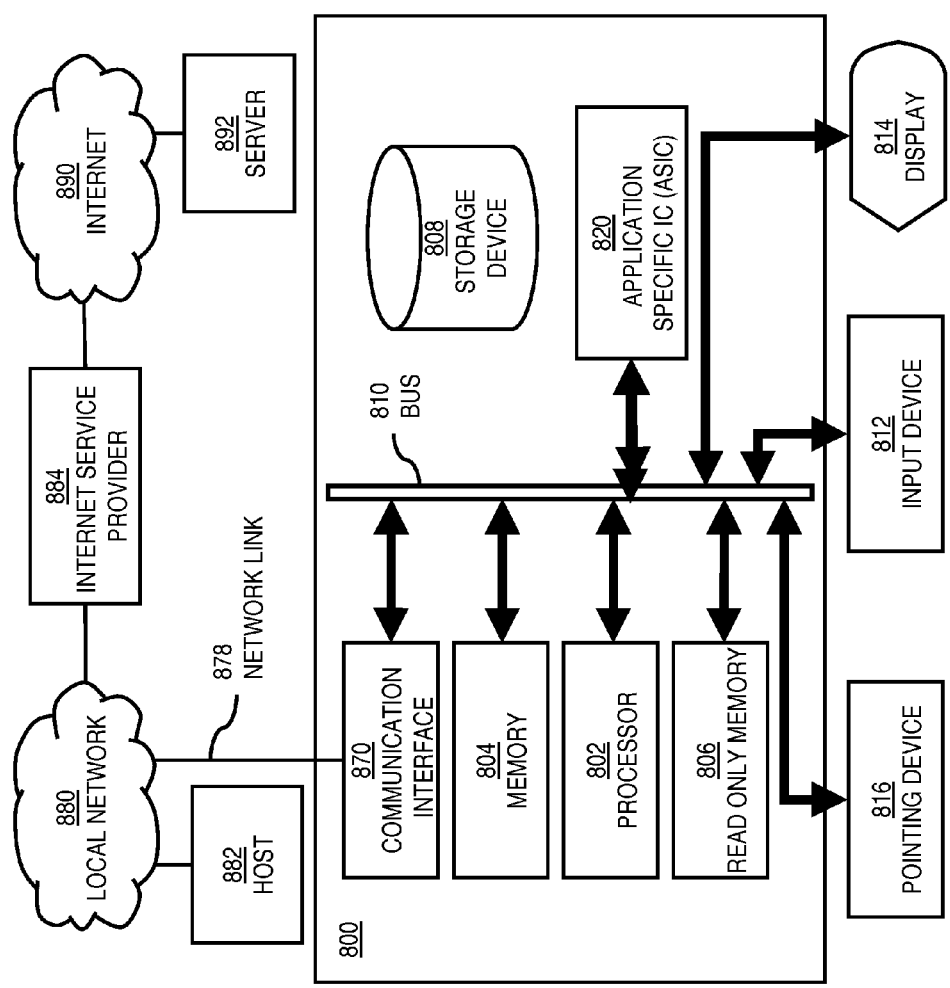
FIG. 8 is a diagram of hardware that can be used to implement an embodiment of the invention.

FIG. 8 illustrates a computer system 800 upon which an embodiment of the invention may be implemented. Although computer system 800 is depicted with respect to a particular device or equipment, it is contemplated that other devices or equipment (e.g., network elements, servers, etc.) within FIG. 8 can deploy the illustrated hardware and components of system 800. Computer system 800 is programmed (e.g., via computer program code or instructions) to provide a trust level to access a resource as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, subatomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 800, or a portion thereof, constitutes a means for performing one or more steps of providing a trust level to access a resource.

A bus 810 includes one or more parallel conductors of information so that information is transferred quickly among devices coupled to the bus 810. One or more processors 802 for processing information are coupled with the bus 810.

A processor (or multiple processors) 802 performs a set of operations on information as specified by computer program code related to providing a trust level to access a resource. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or other dynamic storage device, stores information including processor instructions for providing a trust level to access a resource. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for providing a trust level to access a resource, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT) or a liquid crystal display (LCD), or plasma screen or printer for presenting text or images, and a pointing device 816, such as a mouse or a trackball or cursor direction keys, or motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In certain embodiments, the communications interface 870 enables connection to the communication network 105 for providing a trust level to access a resource to the UE 101.

The term "computer-readable medium" as used herein refers to any medium that participates in providing information to processor 802, including instructions for execution.

Such a medium may take many forms, including, but not limited to computer-readable storage medium (e.g., non-volatile media, volatile media), and transmission media. Non-transitory media, such as non-volatile media, include, for example, optical or magnetic disks, such as storage device 808. Volatile media include, for example, dynamic memory 804. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 820.

Network link 878 typically provides information communication using transmission media through one or more networks to other devices that use or process the information. For example, network link 878 may provide a connection through local network 880 to a host computer 882 or to equipment 884 operated by an Internet Service Provider (ISP). ISP equipment 884 in turn provides data communication services through the public, world-wide packet-switching communication network of networks now commonly referred to as the Internet 890.

A computer called a server host 892 connected to the Internet hosts a process that provides a service in response to information received over the Internet. For example, server host 892 hosts a process that provides information representing video data for presentation at display 814. It is contemplated that the components of system 800 can be deployed in various configurations within other computer systems, e.g., host 882 and server 892.

At least some embodiments of the invention are related to the use of computer system 800 for implementing some or all of the techniques described herein. According to one embodiment of the invention, those techniques are performed by computer system 800 in response to processor 802 executing one or more sequences of one or more processor instructions contained in memory 804. Such instructions, also called computer instructions, software and program code, may be read into memory 804 from another computer-readable medium such as storage device 808 or network link 878. Execution of the sequences of instructions contained in memory 804 causes processor 802 to perform one or more of the method steps described herein. In alternative embodiments, hardware, such as ASIC 820, may be used in place of or in combination with software to implement the invention. Thus, embodiments of the invention are not limited to any specific combination of hardware and software, unless otherwise explicitly stated herein.

The signals transmitted over network link 878 and other networks through communications interface 870, carry information to and from computer system 800. Computer system 800 can send and receive information, including program code, through the networks 880, 890 among others, through network link 878 and communications interface 870. In an example using the Internet 890, a server host 892 transmits program code for a particular application, requested by a message sent from computer 800, through Internet 890, ISP equipment 884, local network 880 and communications interface 870. The received code may be executed by processor 802 as it is received, or may be stored in memory 804 or in storage device 808 or other non-volatile storage for later execution, or both. In this manner, computer system 800 may obtain application program code in the form of signals on a carrier wave.

Various forms of computer readable media may be involved in carrying one or more sequence of instructions or data or both to processor 802 for execution. For example, instructions and data may initially be carried on a magnetic disk of a remote computer such as host 882. The remote computer loads the instructions and data into its dynamic memory and sends the instructions and data over a telephone line using a modem. A modem local to the computer system 800 receives the instructions and data on a telephone line and uses an infra-red transmitter to convert the instructions and data to a signal on an infra-red carrier wave serving as the network link 878. An infrared detector serving as communications interface 870 receives the instructions and data carried in the infrared signal and places information representing the instructions and data onto bus 810. Bus 810 carries the information to memory 804 from which processor 802 retrieves and executes the instructions using some of the data sent with the instructions. The instructions and data received in memory 804 may optionally be stored on storage device 808, either before or after execution by the processor 802.

FIG. 9 illustrates a chip set or chip 900 upon which an embodiment of the invention may be implemented. Chip set 900 is programmed to provide a trust level to access a resource as described herein and includes, for instance, the processor and memory components described with respect to FIG. 8 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of providing user interface navigation information associated with the availability of services. Chip set or chip 900, or a portion thereof, constitutes a means for performing one or more steps of providing a trust level to access a resource.

In one embodiment, the chip set or chip 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 900 includes merely one or more processors and some software and/or firmware supporting and/or relating to and/or for the one or more processors.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide a trust level to access a resource. The memory 905 also stores the data associated with or generated by the execution of the inventive steps.

Figure 10:
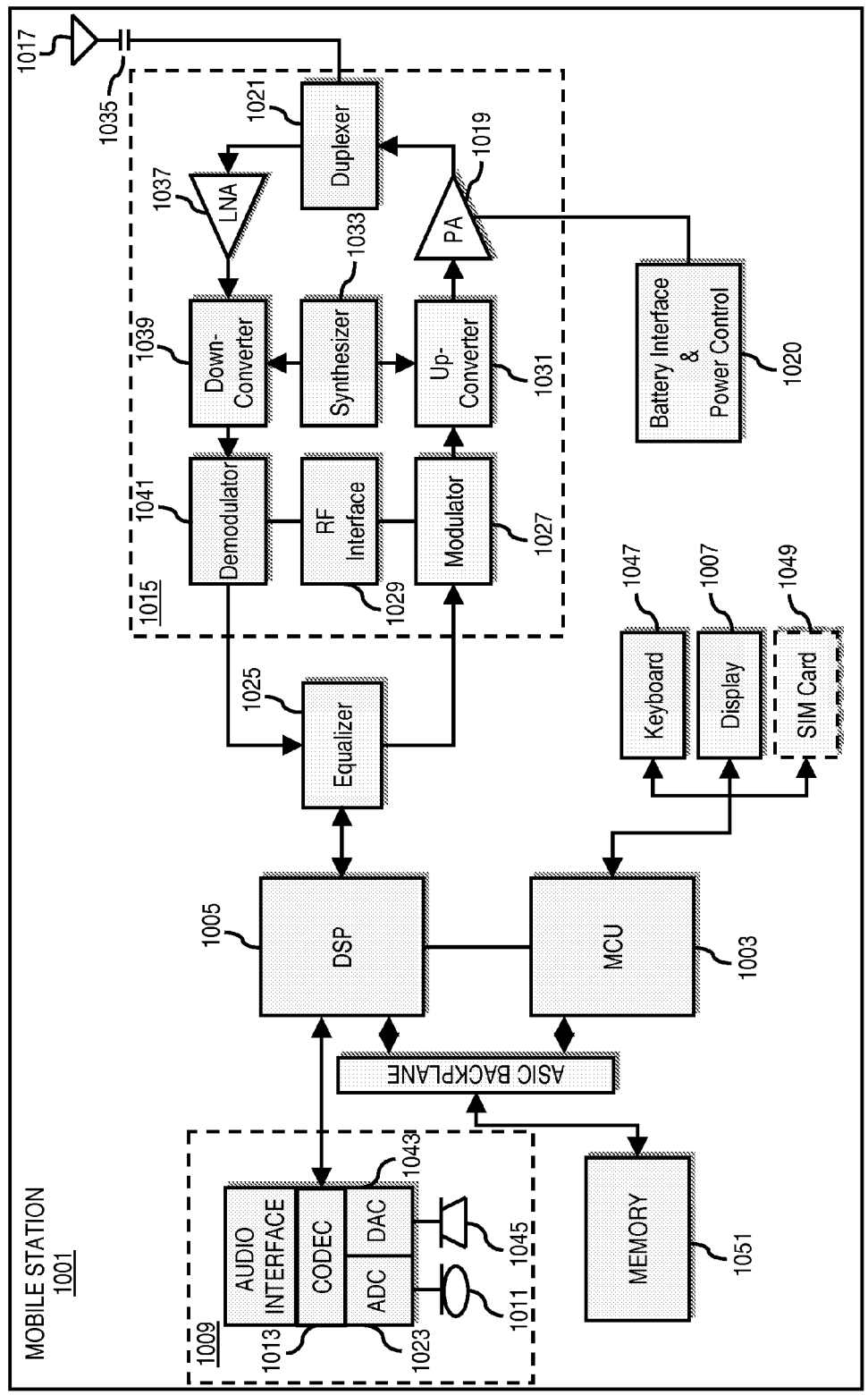
FIG. 10 is a diagram of a mobile terminal (e.g., handset) that can be used to implement an embodiment of the invention.

FIG. 10 is a diagram of exemplary components of a mobile terminal (e.g., handset) for communications, which is capable of operating in the system of FIG. 1, according to one embodiment. In some embodiments, mobile terminal 1000, or a portion thereof, constitutes a means for performing one or more steps of providing a trust level to access a resource. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile terminal functions that perform or support the steps of providing a trust level to access a resource. The display 10 includes display circuitry configured to display at least a portion of a user interface of the mobile terminal (e.g., mobile telephone). Additionally, the display 1007 and display circuitry are configured to facilitate user control of at least some functions of the mobile terminal. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile terminal 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003—which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile terminal 1001 to provide a trust level to access a resource. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the terminal. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile terminal 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile terminal 1001 on a radio network. The card 1049 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    receiving a request at a device, from a first user, to access a resource associated with a second user based, at least in part, on a predetermined privacy level;
    determining trust levels for respective trust paths between the first user and the second user at least in part, on link trust levels corresponding to links between the first user, the second user, and one or more other users between the first user and the second user along the respective trust paths;
    generating a log of access to the resource, the log identifying, at least in part, an accessing user and a trust level of the accessing user;
    presenting a recommended value for the predetermined privacy level based, at least in part, on the log;
    selecting one of the trust paths based, at least in part, on a respective trust level; and
    causing, at least in part, a providing of an access right for the resource to the device, the first user, or a combination thereof based, at least in part, on at least one trust level satisfying the predetermined privacy level,
    wherein the providing of the access right is based, at least in part, on the respective trust level satisfying the predetermined privacy level.

2. A method of claim 1, wherein at least one of the link trust levels decays as it is transferred along links of a respective trust path.

3. A method of claim 1, further comprising:
    determining that the respective trust level corresponding to the selected trust path does not satisfy the predetermined privacy level; and
    selecting another one of the trust paths.

4. A method of claim 1, further comprising:
    categorizing the resource according to a content type,
    wherein the recommended value for the predetermined privacy level is further based, at least in part, on the content type.

5. A method of claim 4, further comprising:
    determining a volume of the content type among the first user, the second user, or a combination thereof,
    wherein the recommended value for the predetermined privacy level is further based, at least in part, on the volume of the content type.

6. A method of claim 1, further comprising:
    causing, at least in part, presentation of a social graph including at least the first user and the second user,
    wherein the social graph depicts the trust level.

7. An apparatus comprising:
    at least one processor; and
    at least one memory including computer program code, the at least one memory and the computer program code configured to, with the at least one processor, cause the apparatus to perform at least the following,
    receive a request at a device, from a first user, to access a resource associated with a second user based, at least in part, on a predetermined privacy level;
    determine trust levels for respective trust paths between the first user and the second user based, at least in part, on link trust levels corresponding to links between the first user, the second user, and one or more other users between the first user and the second user along the respective trust paths;
    generate a log of access to the resource, the log identifying, at least in part, an accessing user and a trust level of the accessing user;
    present a recommended value for the predetermined privacy level based, at least in part, on the log;
    select one of the trust paths based, at least in part, on a respective trust level; and
    cause, at least in part, a providing of an access right for the resource to the device, the first user, or a combination thereof based, at least in part, on at least one trust level satisfying the predetermined privacy level,
    wherein the providing of the access right is based, at least in part, on the respective trust level satisfying the predetermined privacy level.

8. An apparatus of claim 7, wherein at least one of the link trust levels decays as it is transferred along links of a respective trust path.

9. An apparatus of claim 7, wherein the apparatus is further caused to:
- determine that the respective trust level corresponding to the selected trust path does not satisfy the predetermined privacy level; and
- select another one of the trust paths.

10. An apparatus of claim 7, wherein the apparatus is further caused to:
- categorize the resource according to a content type,
- wherein the recommended value for the predetermined privacy level is further based, at least in part, on the content type.

11. An apparatus of claim 10, wherein the apparatus is further caused to:
- determine a volume of the content type among the first user, the second user, or a combination thereof,
- wherein the recommended value for the predetermined privacy level is further based, at least in part, on the volume of the content type.

12. An apparatus of claim 7, wherein the apparatus is further caused to:
- cause, at least in part, presentation of a social graph including at least the first user and the second user,
- wherein the social graph depicts the trust level.

13. An apparatus of claim 7, wherein the apparatus is a mobile phone further comprising:
- user interface circuitry and user interface software configured to facilitate user control of at least some functions of the mobile phone through use of a display and configured to respond to user input; and
- a display and display circuitry configured to display at least a portion of a user interface of the mobile phone, the display and display circuitry configured to facilitate user control of at least some functions of the mobile phone.

14. A non-transitory computer-readable storage medium carrying one or more sequences of one or more instructions which, when executed by one or more processors, cause an apparatus to at least perform the following steps:
- receiving a request at a device, from a first user, to access a resource associated with a second user based, at least in part, on a predetermined privacy level;
- determining trust levels for respective trust paths between the first user and the second user based, at least in part, on link trust levels corresponding to links between the first user, the second user, and one or more other users between the first user and the second user along the respective trust paths;
- generating a log of access to the resource, the log identifying, at least in part, an accessing user and a trust level of the accessing user;
- presenting a recommended value for the predetermined privacy level based, at least in part, on the log;
- selecting one of the trust paths based, at least in part, on a respective trust level; and
- causing, at least in part, a providing of an access right for the resource to the device, the first user, or a combination thereof based, at least in part, on at least one trust level satisfying the predetermined privacy level,
- wherein the providing of the access right is based, at least in part, on the respective trust level satisfying the predetermined privacy level.

15. A non-transitory computer-readable storage medium of claim 14, wherein at least one of the link trust levels decays as it is transferred along links of a respective trust path.

* * * * *